United States Patent Office 3,170,000
Patented Feb. 16, 1965

3,170,000
TERTIARY OLEFIN SEPARATION VIA ETHER-
IFICATION WITH SMALL SURFACE AREA
CATALYSTS
Joseph A. Verdol, Dolton, Ill., assignor to Sinclair Research, Inc., Wilmington, Del., a corporation of Delaware
No Drawing. Filed Oct. 24, 1962, Ser. No. 232,880
21 Claims. (Cl. 260—677)

The present invention provides for the recovery of a $C_4$–$C_7$ tertiary olefin from a mixture of the olefin with hydrocarbons of about the same boiling range, by selectively converting the tertiary olefin to a tertiary ether and separating and decomposing the ether preferably in the vapor phase. The process may be used to separate the tertiary olefin from petroleum refinery streams or other mixtures of the olefin with non-tertiary (secondary and primary) olefins, paraffins, etc.

For example, this process is suitable for the preparation of isoamylenes, for instance of greater than 99 percent purity, from $C_5$ refinery streams composed largely of n-pentane, isopentane, pentene-1, pentene-2 and isoamylenes (2-methyl-2-butene and 2-methyl-1-butene). This process is also suitable for the preparation of isobutylene from $C_4$ refinery streams composed of n-butane, isobutane, butene-2, butene-1 and isobutene as well as preparing 2,3-dimethyl-1-butene; 2,3-dimethyl-2-butene; 2-methyl-1-pentene; 2-methyl-2-pentene; 3-methyl-2-pentene (cis and trans); 2-ethyl-1-butene and 1-methylcyclopentene from refinery streams composed of a mixture of $C_6$ olefins and paraffins.

According to the instant invention, the tertiary aliphatic, including cycloaliphatic, alkene contained in a mixed hydrocarbon stream, boiling primarily in the $C_4$ to $C_7$ range and usually containing at least about 5 to 90% or more of the tertiary alkene, is caused to selectively react with a lower aliphatic primary alcohol of up to about 6 carbon atoms and the resulting tertiary ether product is decomposed by contact with a low area, solid weakly acid-acting metal oxide catalyst at elevated temperatures. A refinery mixed stream generally contains about 10 to 60% tertiary alkene. A tertiary olefin contains a tertiary carbon atom, i.e. a carbon atom bonded to three other carbon atoms, and connected to one of these carbon atoms by a double bond.

This process provides a method of preparing a wide variety of substantially pure tertiary olefins, such as isobutene, isoamylenes, isohexenes and isoheptenes which are of current interest as raw materials for the synthesis of neo-acids and neo-alcohols. Neo-acids and neo-alcohols have recently aroused much interest as components of synthetic lubricants having improved oxidation resistance and high temperature properties. Tertiary olefins also are used in preparing alkylated phenols, such as tertiarybutyl phenols for use in modified phenol-formaldehyde resins. Isoamylenes, for example, are of importance as raw material for the preparation of isoprene, which is in turn used to prepare "synthetic natural" rubber. The 3-methyl-1-butene which is prepared from 2-methyl-2-butene or 2-methyl-1-butene is of interest as a monomer for the preparation of polymers. Isobutylene of high purity is desired for the preparation of butyl rubber.

The etherification can be performed, for instance, by using an ion-exchange material in the hydrogen form and in an amount sufficient to catalyze the selective conversion to the tertiary alkyl ether. The ether thus formed can be easily separated from the reaction mixture by distillation and the substantially pure tertiary alkene recovered in good yields by decomposing the ether. The decomposition reaction is carried out by contacting the tertiary ether with a low, area, solid, acid-acting metal oxide catalytic material selected from the oxides of magnesium, aluminum, and metals of Groups IVA, VA and VIA of the periodic table of elements as given on page 122 of "Inorganic Chemistry," 1955, Therold Moeller, John Wiley & Sons, New York, N.Y., at a high temperature to recover the teritary olefin and alkanol reactants.

The organic hydrogen ion exchange etherification catalysts useful in accordance with the present invention are relatively high molecular weight water-insoluble resins or carbonaceous materials containing an $SO_3H$ functional group or a plurality of such groups. These catalysts are exemplified by the sulfonated coals (Zeo-Karb H, Nalcite X, and Nalcite AX) produced by the treatment of bituminous coals with sulfuric acid, and commercially marketed as zeolitic water softeners or base exchangers. These materials are usually available in a neutralized form, and in this case must be activated to the hydrogen form, by treatment with a mineral acid, such as hydrochloric acid, and water washed to remove sodium and chloride ions prior to use. Sulfonated resin type catalysts include the reaction products of phenol-formaldehyde resins with sulfuric acid (Amberlite IR–1, Amberlite IR–100, and Nalcite MX). Also useful are the sulfonated resinous polymers of coumarone-indene with cyclopentadiene, sulfonated polymers of coumarone-indene with furfural, sulfonated polymers of coumarone-indene with cyclopentadiene and furfural and sulfonated polymers of cyclopentadiene with furfural. The preferred cationic exchange resin is a strongly acidic exchange resin consisting essentially of a sulfonated polystyrene resin, for instance a divinylbenzene cross-linked polystyrene matrix having about 0.5 to 20 percent, preferably about 4 to 16%, divinylbenzene therein to which are attached ionizeable or functional nuclear sulfonic acid groups. This resin is manufactured and sold commercially under various tradenames, e.g. Dowex 50, Nalcite HCR. This resin, as commercially obtained, has a moisture content of about 50% and it can be used in the instant process in this form or it can be dried and then used with little or no differences in results ascertainable. The resin can be dried as by heating at a temperature of about 212° F. for 12 to 24 hours or the free water can be removed as by refluxing with benzene or similar solvents and then filtering.

The resin particle size is chosen with a view to the manipulative advantages associated with any particular range of sizes. Although a small size (200–400 mesh) is frequently employed in autoclave runs, a mesh size of 20–50 or larger seems more favorable for use in fixed bed or slurry reactors. The catalyst concentration range should be sufficient to provide the desired catalytic effect, e.g. between about 0.5 and 50 percent (dry basis) by weight of the reactants, with the preferred range being between about 5 to 25 percent (dry basis), for example, 10 percent.

In a continuous reactor the catalyst concentration is better defined by weight hourly space velocity; that is to say, the weight of feed processed per weight of catalyst per hour. A weight hourly space velocity of about 1 to 8 (based on hydrocarbon feed) and up to about 17 based on total hydrocarbon and alcohol may be used with advantage. The WHSV can be about 0.1 to 100 based on hydrocarbon feed only, with the preferred WHSV being about 2 and 20.

The ether is formed by reacting the tertiary olefin in the hydrocarbon mixture with a primary alcohol, whether mono- or polyfunctional. A ratio of about 0.1 to 100 moles of primary alcohol (or polyol containing primary hydroxy groups) per mole of tertiary olefin may be used in the etherification with the usual amount being between about 1 and 10 moles of primary alcohol per mole of tertiary olefin, preferably about 5 to 10 moles of the alcohol. A high ratio of alcohol to t-olefin increases the amount of olefin taken from the mixed hydrocarbon feed stream.

Primary alcohols, whether mono- or polyfunctional are effective in the etherification step of this process. Although secondary alcohols do react with tertiary olefins, the conversion rate is too low for practical purposes. Economy and ease of volatilization during the decomposition step generally dictate the use of alcohols of 1 to 6 carbon atoms. Another factor which influences the choice of alcohol is the boiling point difference between the alcohol and the azeotrope of the alcohol with its ether, if it is preferred to separate excess alcohol from the etherification reaction mass and feed a vaporized azeotrope of alcohol and ether to the decomposition step. The azeotrope alcohol and the ether produced alcohol are readily fractionated or condensed separately from each other after the decomposition step. In general, ethanol and methanol are preferred because of economy and, usually, they afford higher conversion rates, as shown in Table I.

In the runs listed in Table I, below, the respective alcohols were reacted with a petroleum refinery hydrocarbon stream containing 38.4 percent isoamylenes (2-methyl-2-butene and 2-methyl-1-butene) as well as $C_5$ paraffins and other $C_5$ olefins. The feed was charged to an autoclave with an excess of the alcohol shown, usually 5–10 moles of alcohol per mole of refinery feed. About 5–20 percent by weight of a Dowex 50 catalyst described above was added and the mixtures were heated in the autoclave under autogenous pressure at 150 to 175° F. for a period of about 5 hours. The reaction mixtures were then analyzed by vapor phase chromatography (VPC) to determine the amount of isoamylenes converted to tertiaryamyl alkyl ethers.

TABLE I

| Example | Alcohol Reactant | Identity of Ether Formed | Percent Conversion of Isoamylenes to Ether(s) |
|---|---|---|---|
| 1 | Methanol | Tertiaryamyl methyl ether | 70–79 |
| 2 | Ethanol | Tertiaryamyl ethyl ether | 50–55 |
| 3 | Butanol | Tertiaryamyl butyl ether | 38–39 |
| 4 | Isopropanol | Tertiaryamyl isopropyl ether | 10–15 |
| 5 | Ethylene glycol | Ethylene glycol mono- and ditertiaryamyl ether | 10–13 |
| 6 | 3-methyl-1,5-pentanediol | 3-methyl-1,5-pentanediol mono- and ditertiaryamyl ether | 17 |

The etherification temperature range is about 100–350° F., with the preferred limit being from about 100–225° F. The lower temperature range is preferred, since the formation of the tertiary ether is favored, and the formation of dialkyl ether (dimethyl ether in the case of methanol being used as the alcohol reactant) is not significant at lower temperatures. Runs performed at autogenous pressures and others performed under nitrogen pressure of 400–500 p.s.i.g. showed that pressure has no significant effect upon the reaction. The pressure may range from about atmospheric pressure to about 5000 p.s.i.g. or more, with the preferred limits being between about atmospheric pressure and about 600 p.s.i.g. Pressures above atmospheric pressure may be required to maintain the reactants in the liquid phase; however, the reaction can be carried out at autogenous pressure in a continuous system, which is preferred for commercial operation. Batchwise reaction in an autoclave is feasible.

The decomposition of tertiaryamylmethyl ether, for example, to isoamylenes and methanol with little, if any, dimethyl ether being produced, at a rapid rate and under high temperature conditions by contact of the tertiary ether in the vapor phase with a low area, acid-acting solid metal oxide catalytic material enables one to obtain isoamylenes of extremely high purity. The purity of the isoamylenes obtained by this process can be greater than 99 percent. The purity of the isoamylene may be determined by the purity of the tertiaryamyl methyl ether employed in the regeneration reaction. However, the presence of impurities such as tertiaryamyl alcohol in the tertiaryamyl methyl ether produces no change in isoamylene purity because this alcohol is converted to isoamylenes under the reaction conditions. Also, it is an important discovery of this invention that the presence in the decomposition zone of excess alcohol from the etherification is usually not detrimental to olefin purity and does not cause any significant etherification of the alcohol, for example, etherification of methanol to dimethyl ether. Therefore, after the etherification step, only unreacted hydrocarbon need be removed before decomposition, although, if preferred, some excess alcohol may be removed by distillation, or all of the alcohol may be removed from the ether as, for example, by water washing.

The tertiary ethers derived from a primary alcohol and tertiary olefin undergo the decomposition reaction to form the initial tertiary olefin and alcohol. The tertiary ether has the structure ROR' where R is an aliphatic hydrocarbon, including cycloaliphatic, radical of 4 to 7 carbon atoms with a tertiary carbon atom in the alpha position and R' is an aliphatic, including cycloaliphatic, hydrocarbon radical of 1 to 6 carbon atoms. When the ether is derived by the reaction of a tert-olefin and a primary alcohol, the alpha carbon atom of R' is a primary carbon atom. R and R' may be substituted with substituents which do not interfere with the desired reaction. Typical examples are tertiaryamyl methyl ether, tertiaryamyl ethyl ether, tertiaryamyl propyl ether, tertiarybutyl methyl ether, tertiarybutyl ethyl ether, tertiarybutyl propyl ether, etc. Higher molecular weight ethers such as tertiaryhexyl methyl ether, etc., also undergo this reaction.

The decomposition is performed at a temperature of about 350–1000° F. with the preferred range being between about 450 or 600 and 900° F. The tertiary ether is passed, generally in the vapor phase, over the low area, solid, acid-acting metal oxide catalyst. This catalyst is the solid oxide of a mildly electronegative element or a mixture of such oxides. Such elements are shown in the periodic arrangement known as "Lothar Meyer's Atomic Volume Curve," which appears, for example, in Parke's "Mellor's Modern Inorganic Chemistry," London; Longmans, 1939, p. 121. The mildly electronegative elements, the oxides of which provide the catalyst used in the decomposition phase of this invention are found in the lower half or third of the descending portions of this curve and include also silicon. Partington in "A Text-Book of Inorganic Chemistry, London," Mcmillan, 1950, p. 374, describes these as the "more or less electronegative elements." The mildly electronegative elements which form solid acid-acting oxides are, other than boron and silicon, metals, and include magnesium, aluminum and the elements having atomic numbers from 22 to 28 (Ti, V, Cr, Mn, Fe, Co and Ni) as well as zirconium, molybdenum and tungsten. These elements in the lower half or third of Lothar Meyer's Atomic Volume Curve include titanium, zirconium, hafnium, vanadium, niobium, tantalum, chromium, molybdenum and tungsten which form groups IVA, VA and VIA of the periodic chart as noted above. The catalysts are refractory oxides and many suitable materials are commercially available. These catalysts are frequently composed of mixed acid-acting oxides of metals and semi-metals. The major component may be alumina, silica, MgO, $B_2O_3$, $W_2O_3$, $TiO_2$ or $V_2O_5$ or the acid-acting inorganic solid may be supported on an inert material such as charcoal. The catalyst is usually calcined or activated at a minimum temperature of about 700° F. In any event, in the process of this invention the catalyst employed in the decomposition will be activated, either before or during initial use, at a temperature of at least that of the decomposition reaction.

A low area catalyst is used in the decomposition. Such a catalyst will usually have a surface area of less than about 25 square meters per gram, frequently not exceeding 5 or 10 square meters per gram and often less than about 1 square meter per gram, and may be a fused silica-alumina material, for instance containing a minor amount of silica, which has been calcined at a temperature of at least about 4000° F. In addition to alumina the fused material may contain minor amounts of other acid-acting solid oxides such as $SiO_2$, $B_2O_3$, $Cr_2O_3$, $TiO_2$ and/or $ZrO_2$ in a total of about 5–30%, preferably about 10–20%. Another low area material which can be employed in the ether decomposition is alpha-alumina which can be made by calcining alumina hydrates or gamma-aluminas at temperatures of about 2000 to 3700° F. The family of gamma aluminas are usually obtained by calcination of alumina hydrates at temperatures of about 500 or 700 to 1300 or 1500° F., and have high surface area and greater activity than the low area catalysts. The high area material frequently has a surface area above about 50–100 square meters per gram or even as high as 500 $m.^2$/gm. or more, and gives a higher percentage of dimethyl ether in the decomposition reaction.

Generally, the amount of catalyst employed is about 1 to 25 weight percent of the tertiary ether, preferably about 5 to 20%. For a continuous reaction, the amount of catalyst and ether employed usually give a space velocity of about 0.5 to 10 WHSV. It is preferred to carry out the decomposition or cracking reaction at atmospheric pressure or slightly below atmospheric pressure. The pressure will usually be between about ½ and 25 atmospheres, with the preferred being about 1 atmosphere. The reaction can be carried out batchwise in an autoclave reactor under autogenous pressure, or in a continuous or semi-continuous reactor system, and vapor phase reactions are preferred, although liquid phase reactions can be used.

The decomposition reaction is probably to some extent thermal as well as catalytic, but the solid must be at least to some extent acidic in the environment of the decomposition zone, since passage of the ether over glass beads at about 770° F. gives no significant decomposition to the desired products.

A series of runs were made using glass beads, which shows this non-acid-acting material to be quite ineffective for selective decomposition of tertiaryalkyl ethers to tertiary olefins. Tertiaryamyl methyl ether samples were subjected to varying temperatures by contact with Pyrex glass beads at atmospheric pressure in a fixed bed reactor, as reported below in Table II. The products from the experiments were analyzed by vapor phase chromatography.

TABLE II

| Example | 7 | 8 | 9 |
|---|---|---|---|
| Temperature of reactor (° F.) | 866 | 933 | 1090 |
| WHSV | 0.25 | 0.25 | 0.4 |
| Percent Conversion of ether to isoamylenes | 1.45 | 4.1 | 21 |
| Percent of $C^4$ hydrocarbons in product | | | 4 |

A non-acid-acting contact mass, therefore, shows little effect on decomposing the ether to olefin and alcohol even at 933° F. Although the ether can be decomposed at temperatures approaching 1100° F., there is minimum selectivity, since $C_4$ hydrocarbons are also formed. Yet when tertiaryamyl methyl ether was passed through a reactor packed with ¼ inch tabular alpha-alumina granules and heated to about 770° F. there was obtained a 72 percent conversion of the ether to isoamylenes. This weakly-acid type of catalyst is of particular interest, since little or no ascertainable dimethyl ether is formed in the reaction.

The present invention can be further illustrated by reference to the following specific examples which are not to be considered as limiting the scope of the invention. The temperatures used in the decomposition reactions do not necessarily represent the optimum temperature for any given catalyst.

Example 10

Into a 1-liter autoclave were charged 250 ml. (163 g.) of 2-methyl-2-butene and 250 ml. (200 gms.) of commercial grade methanol. The mole ratio of methanol to 2-methyl-2-butene was 5.34 to 1. Fifty grams of Dowex 50X–12 sulfonated polystyrene-divinylbenzene type resin catalyst containing 12% divinylbenzene was added to the autoclave. The catalyst had a mesh size of 50–100 and contained from 42–48 percent moisture. The autoclave was sealed and the reaction mixture heated at 200° F. (under autogenous pressure) for a period of about seven hours. The product was removed after cooling and depressurizing the autoclave. The product was worked up by first distilling off the unreacted 2-methyl-2-butene. The distillate (residue) was then washed several times with cold water to wash out the methanol. The methanol-free product was then distilled at atmospheric pressure to give pure tertiaryamyl methyl ether, B.P. 85–86° C., $n_D^{25}$ 1.3860, and a small amount of tertiaryamyl alcohol, B.P. 101–102° C., $n_D^{25}$ 1.4025. The percent conversion of the 2-methyl-2-butene to tertiaryamyl methyl ether was 63 percent. The percent conversion of the 2-methyl-2-butene to tertiaryamyl alcohol was only 1.6 percent.

Example 11

Into a 1-liter autoclave were charged 134 grams of isobutylene, 200 gms. of methanol and 50 grams of Dowex 50X–12 catalyst. The reaction mixture was heated under autogenous pressure at 150° F. for a period of about 4 hours and the autoclave cooled to room temperature. Analysis of the reaction mixture by VPC showed that about 90 percent of the isobutylene was converted to the tertiarybutyl methyl ether, B.P. 54–55° C. $n_D^{25}$ 1.3668.

The above experiment illustrates that isobutylene and methanol react almost completely in the presence of Dowex 50 catalyst to afford tertiarybutyl methyl ether.

Example 12

Into a 1-liter autoclave were charged 160 grams of butene-1, 200 grams of methanol, and 50 grams of Dowex 50X–12 catalyst. The reaction mixture was heated under autogenous pressure at 150–160° F. for about 8 hours. The autoclave was cooled and the contents removed. Analysis of the reaction mixture showed that it contained 0.5% of secondary butyl methyl ether, indicating that less than 1 percent of the butene-1 was converted to ether.

Examples 13 to 15

A 1-liter autoclave was charged with 125 ml. of 2-methyl-2-butene, 125 ml. of 2-pentene and 250 ml. of methanol. Fifty grams of Dowex 50X–12 catalyst (sulfonated polystyrene-divinylbenzene resin containing 12% divinylbenzene, mesh size of 50–100, 42–48% $H_2O$) was charged to the autoclave, which was heated to the desired temperature for a period of about seven hours. The products were worked up by washing the methanol from the reaction mixture and then distilling the remaining products at atmospheric pressure. In all these runs the only olefin-methanol reaction products isolated by distillation of the reaction mixtures were tertiaryamyl methyl ether and tertiaryamyl alcohol. The results of these operations are summarized in Table III below.

TABLE III

| Reactants | 13 | 14 | 15 |
|---|---|---|---|
| | 125 ml. 2-pentene; 125 ml. 2-methyl-2-butene; 250 ml. methanol | 125 ml. 2-pentene; 125 ml. 2-methyl-2-butene; 250 ml. methanol | 125 ml. 2-pentene; 125 ml. 2-methyl-2-butene; 250 ml. methanol |
| Mole Ratio of Methanol to 2-Me-2-Bu | 5.3 | 5.3 | 5.3 |
| Reaction Temp., °F | 200 | 250 | 300 |
| Reaction Time, Hrs | 7 | 7 | 7 |
| Percent Conversion of 2-Me-2-Bu to t-amylmethyl ether | 65 | 49 | 41 |
| Percent Conversion of 2-Pentene to 2-Methoxy pentane | <1 | <1 | <1 |
| Percent Conversion of 2-Me-2-Bu to t-Amyl Alcohol | 12 | 11 | 3 |
| Total Percent Conversion of 2-Me-2-Bu | 77 | 60 | 44 |
| Percent Conversion of Methanol to Dimethyl Ether | 1.5 | 30 | 76 |

The above examples illustrate that pentene-2 is essentially unreactive with methanol under conditions which effect the reaction of isoamylene and methanol to a completion of 90 percent. Thus Examples 11 and 12 show that isobutylene and butenes can be separated by reacting out most of the isobutylene while Examples 13 to 15 show that isoamylene can be separated from its normal isomer by etherification.

Examples 16 and 17

In the following examples a mixed $C_5$ hydrocarbon feed obtained from a petroleum fluid catalyst cracking unit was employed as the source of material containing isoamylenes. Analysis of this feed showed that it had the following weight percent composition:

Isopentane _____ 26.9
n-Pentane _____ 5.9
Pentene-1 _____ 4.7
Pentene-2 _____ 19.6
2-methyl-2-butene _____ 28.6
2-methyl-1-butene _____ 12.8
Hexenes _____ 1.5

The total weight percent of isoamylenes in the feed was 41.4 percent.

Several runs were carried out by charging the desired amounts of $C_5$ refinery feed and methanol to a 1-liter autoclave, so that the total charge was 500 ml. The catalyst was added to the autoclave (50 gms. of Dowex 50X–12) and the autoclave was sealed and heated to the desired temperature for about 7 hours. After cooling and depressurizing the bomb the reaction mixtures were worked up by washing out the methanol and collecting the remaining products by distillation at atmospheric pressure. In the runs conducted, the only olefin-methanol reaction product formed was tertiaryamyl methyl ether. Table IV below summarizes runs which vary in reaction temperature and ratio of methanol to $C_5$ feed.

TABLE IV

| Example | 16 | 17 |
|---|---|---|
| Ml. Methanol Used | 250 | 150 |
| Ml. Mixed $C_5$ Feed Used | 250 | 300 |
| Mole Ratio of Methanol to Isoamylenes | 6.5/1 | 15.3/1 |
| Volume Ratio Methanol to $C_5$ Feed | 1/1 | 2/1 |
| Reaction temperature, °F | 150 | 200 |
| Reaction Time, hrs | 7 | 7 |
| Percent Conversion of Isoamylenes in Feed to Tertiaryamyl methyl ether | 57 | 80 |
| Percent Conversion of Isoamylenes to Tertiary-amyl alcohol | 6 | 0 |
| Total Percent Conversion of Isoamylenes | 63 | 80 |
| Percent Conversion of Methanol to Dimethyl Ether | 0 | 3 |

Examples 18 to 20

The following operations were carried out in order to determine whether or not the reaction of isoamylenes and methanol in the presence of Dowex 50 catalyst was adaptable to continuous processing. The reactions were carried out in a stainless steel upflow reactor heated by a circulating heat exchanger. The methanol and a mixed $C_5$ hydrocarbon feed containing 41.4% isoamylenes were blended to give the desired composition and the mixed feed was pumped into the bottom of the reactor. The reactor was maintained at 400–500 lbs./in.$^2$ gauge (nitrogen) pressure in order to maintain a liquid phase throughout the system. The reactor was packed with Dowex 50X–8 catalyst having a divinylbenzene content of 8%, which had a mesh size of 20–50 mesh. The moisture content of the fresh catalyst was 45–55 percent. However, the moisture content diminished with use, since the water content of the feed was quite low. The reactor was approximately 1 inch in diameter and 30 inches in length. The reactor was packed with the desired amount of catalyst which would enable the experiment to be carried out at the pre-calculated space velocity.

The reactor was brought to the desired reaction temperature and the pump was set to the desired rate. The reactants were removed from a dip tube located about 1 inch from the top of the reactor and which led to a knockout pot located at a level approximately equal to that of the bottom of the reactor. Products were removed from the knockout pot through a cold water condenser and finally into a series of Dry Ice traps. The product was removed from the reactor at a rate equal to that of the inlet feed. The reaction mixtures were worked up by washing the methanol from the crude reaction products and distilling the remainder of the reaction products at atmospheric pressure.

Table V summarizes the results of a series of reactions which were carried out in the continuous reactor.

TABLE V

| Example | 18 | 19 | 20 |
|---|---|---|---|
| Volume Ratio of Methanol to Hydrocarbon Feed | 1/1 | 1/1 | 1/1 |
| Catalyst | (¹) | (¹) | (¹) |
| Mole Ratio of Methanol to Isoamylenes | 6.5/1 | 6.5/1 | 6.5/1 |
| Total Weight Hourly Space Velocity | 2.2 | 4.4 | 17.6 |
| Weight Hourly Space Velocity Based on Hydrocarbon Feed | 1 | 2 | 8 |
| Reaction Temp., °F | 200 | 200 | 200 |
| Percent Conversion of Isoamylenes to t-Amylmethyl ether | 58 | 60 | 65 |
| Percent Conversion of Isoamylenes to t-Amyl alcohol | 5 | 0.4 | -------- |
| Total Conversion of Isoamylenes | 63 | 60.4 | 65 |
| Percent Conversion of Methanol to Dimethyl Ether | <1 | 6 | 0 |

¹ Dowex 50X–8.

Example 21

The following run was carried out in order to demonstrate that the selective reaction of isobutylene and methanol can be carried out in a continuous flow reactor. The reactor described above was maintained at 400–500 lbs./in.$^2$ nitrogen pressure in order to maintain a liquid phase through the course of the reaction. The hydrocarbon feed employed was a mixture of isobutylene and butene-1, containing 51.5 percent isobutylene. The reactor was packed with Dowex 50X–8 catalyst as described in the previous examples. The reactor was heated to about 16° F. and the methanol and hydrocarbon feed were pumped into the reactor separately. The hydrocarbon feed was pumped into the reactor at a rate of 205 grams per hour and the methanol was pumped into the reactor at a rate of 278 grams per hour. After running the experiment for two hours a total of 754 grams of product was collected. Analysis of the reaction mixture showed that 85 percent of the isobutylene in the mixed butene-1 isobutylene feed was converted to tertiarybutyl methyl ether. Essentially no secondary butyl methyl ether was detected in the reaction mixture.

The tertiarybutyl methyl ether is easily recovered in purified form from one portion of the reaction mixture by distilling off the unreacted $C_4$ hydrocarbons and subsequently washing out the methanol from the rest of this portion with water. The other portion was subjected first to a distillation which removed the unreacted $C_4$ hydrocarbons from the reaction mixture. Further distillation gave an azeotrope containing 85 percent by weight of tertiarybutyl methyl ether and 15 percent by weight of methanol. This azeotrope showed B.P. 51–52° C., $n_D^{25}$ 1.3640, and was easily decomposed directly to afford isobutylene and methanol. The weight hourly space velocity for this experiment was 12 based on total feed of methanol and hydrocarbon and 5.1 based on hydrocarbon alone.

*Example 22*

A run was conducted to show that a variety of olefins could be extracted from a selected cut of a refinery stream boiling in the range of $C_6$ paraffins and olefins. The complete analysis of the refinery stream could not be determined, owing to the complexity of the mixture. The refinery stream selected for this study was obtained by distilling a fluid catalytically cracked gasoline to obtain a fraction boiling at 110–163° F. Analysis of the stream showed that it contained a total olefin content of 62 percent. The run was conducted in the continuous reactor, already described, which was packed with Dowex 50X–8 catalyst (20–50 mesh). A mixture of the $C_6$ fraction and methanol was pumped into the reactor at a rate of about 1000 gms. per hour. The feed was prepared by mixing equal volumes of the $C_6$ refinery stream and methanol. The total weight hourly space velocity employed was 10 (based on weight of refinery feed and methanol). The reactor was brought to a temperature of 200° F. and maintained at a pressure of 500 p.s.i.g. with nitrogen. A prerun was made at this temperature before starting the run, in order to obtain equilibrium conditions in the reactor system.

The total product after operating the run for one hour weighed 1055 grams. Analysis of the product by VPC showed that 36 percent of the $C_6$ refinery stream was converted to tertiaryhexyl methyl ethers. The ethers were isolated from the reaction mixture by washing out the methanol with water and distilling the residue. The mixed tertiarylhexyl methyl ethers were collected at 105–111° C., $n_D^{25}$ 1.4013–1.4019.

*Example 23*

A Pyrex tube 40 cm. in length and 2.5 cm. in diameter was packed with 50 grams of ¼″ tabular North fused alumina granules and heated in an electric furnace to 760–770° F. Norton alumina is a fused silicia-alumina which has been calcined at a temperature of about 4000° F., is composed of about 85⅛% $Al_2O_3$, 12.7% $SiO_2$, 0.2% $Fe_2O_3$, 0.2% MgO, 0.1% CaO, 0.3% $Na_2O$, 0.2% $K_2O$ and 0.4% $TiO_2$ and has a surface area of about 0.025 square meter per gram. Tertiaryamylmethyl ether, B.P. 85–86.5° C., $n_D^{25}$ 1.3860 (which was prepared from the reaction of the refinery feed described above with methanol), was pumped through the tube at a rate of 50 ml. per hour. The product of the reaction was collected in Dry Ice traps located below the Pyrex reactor tube. The reactor was at atmospheric pressure. The product of the reaction was washed free of methanol with cold water and distilled at atmospheric pressure to give the regenerated isoamylenes and unreacted tertiaryamyl methyl ether. Analysis of the product showed the following yields:

WEIGHT PERCENT COMPOSITION OF REGENERATED TERTIARYAMYL METHYL ETHER PRODUCTS

Dimethyl ether _____ 0.0
Isoamylenes _____ 50.1
Methanol _____ 21.5
t-Amylmethyl ether _____ 28.4

The above analysis shows that 72 percent of tertiaryamyl methyl ether was converted to isoamylenes at 760–770° F. over the low area fused silica-alumina granules. The isoamylenes recovered from the reaction mixture by distillation were analyzed by VPC analysis to show the following:

PERCENT COMPOSITION OF REGENERATED ISOAMYLENES 2-methyl-1-butene _____ 55.3
2-methyl-2-butene _____ 44.7

No impurity could be detected by VPC analysis, indicating a purity of greater than 99 percent for the isoamylenes obtained by the regeneration of tertiaryamyl methyl ether over the low area fused silica-alumina beads. Also, no dimethyl ether was produced in the decomposition of the tertiary ether.

The Catalyst A used in Examples 24 and 28 had the following composition in percentages by weight: $Al_2O_3$, 99.5%; $SiO_2$, 0.04%; $Fe_2O_3$, 0.06%; $Na_2O$, 0.02%; bulk density (lb./ft.$^3$), 120; specific gravity, 3.65–3.8; apparent porosity, 5%; water absorption, 2% and was a non-fused alpha-alumina product which had been calcined at a temperature of about 3000 to 3700° F. Catalyst A had a surface area of less than 1 square meter per gram. The Norton alumina used in Examples 25, 26, and 27 reported in Table VI is described above. Catalyst B is a mostly gamma-alumina product made by calcining alumina trihydrate at a temperature of about 900 to 1000° F. and had a surface area of about 260 square meters per gram. The runs reported in Table VI were conducted in the same apparatus as Example 23.

TABLE VI

| Example | 24 | 25 | 26 | 27 | 28 | 29 | 30 |
|---|---|---|---|---|---|---|---|
| Feed | t-Butyl methyl ether. | t-Amylmethyl ether | | | Azeotrope: 15% methanol; 85% t-butylmethyl ether | | |
| Catalyst | A | Norton Alumina | | | A | B | B |
| Surface Area (m.²/g.) | <1 | 0.025 | 0.025 | 0.025 | <1 | 260 | 260 |
| Temp., °F | 775 | 760 | 760 | 760 | 880 | 500 | 600 |
| WHSV | 0.6 | 0.64 | 1.0 | 1.52 | 1.0 | 1.4 | 1.4 |
| Percent Conversion Ether to Olefin | 66 | 86 | 72 | 56.5 | 65 | 23 | 92 |
| Percent Dimethyl ether in isobutylene product | 0 | <0.2 | 0 | <0.2 | 1 | 15 | 9 |

When using a high surface area gamma alumina (Examples 29 and 30), there is produced a relatively high percentage of dimethyl ether in respect to the percent conversion of the ether to the tertiary olefin. However, when a low surface area alumina material is used very little, if any, dimethyl ether was produced on the decomposition of the tertiary ether.

Examples 31 to 37

The apparatus of Example 23 was packed with a variety of acid-acting oxide catalysts having various surface areas and which had been preheated to reaction temperature. To the apparatus was fed tertiaryamyl methyl ether as produced from refinery mixed streams as described above. These runs were conducted at atmospheric pressure and the results are given in Table VII below.

TABLE VII

| Examples | Catalyst | Surface Area (m.²/g.) | Reaction Temp. (° F.) | WHSV | Product Analysis | |
|---|---|---|---|---|---|---|
| | | | | | Percent Isoamylenes | Percent Dimethyl Ether |
| 31 | MgO, 100-200 mesh | <1 | 650 | 0.7 | 44.5 | Trace. |
| 32 | B₂O₃, 20 mesh | <1 | 630 | 1.9 | 11 | Trace. |
| 33 | 5% CoO on charcoal | >200 | 550 | 1.2 | 20 | 7.7. |
| 34 | Granular Sea Sand (SiO₂) | <1 | 650 | 2.2 | 5 | Trace. |
| 35 | WO₃, ¾₁₆″ pellets | <2 | 450 | 1.4 | 94.5 | 2.3. |
| 36 | TiO₂, 14 mesh | <1 | 400 | 2.6 | 85 | Trace. |
| 37 | V₂O₅, 100-150 mesh | <1 | 480 | 3 | 33.5 | Trace. |

When the tertiaryamyl methyl ether is passed over the non-metal oxides of Examples 32 and 34, very little decomposition of the tertiary ether occurs. Also, when passing the tertiary ether through the high surface area metal oxide in Example 33, the ether is decomposed to a certain extent but there is also produced a high percentage of dimethyl ether. However, when the tertiary ether is passed through the low surface area metal oxide material of Examples 31, 35, 36 and 37, a higher percentage of isoamylene was produced with very little, if any, dimethyl ether relative to the conversion of the tertiary ether to the olefin.

Example 38

It has been demonstrated that the tertiaryhexyl methyl ethers can be decomposed to afford tertiary olefins. The apparatus used for this decomposition was described for the runs relating to the decomposition of tertiaryamyl methyl ether and tertiarybutyl methyl ether. The tertiaryhexyl methyl ether was fed at a WHSV of 0.5 to alpha alumina granules (Catalyst A described above) at a temperature of 800° F. 65% of the ether was converted to the following olefins in approximately the following percentages:

| | |
|---|---|
| 1-methylcyclopentene | 3.59 |
| 2,3-dimethyl-1-butene | 6.83 |
| 2-methyl-1-pentene | 34.72 |
| 2-ethyl-1-butene | 10.07 |
| 2-methyl-2-pentene | 18.40 |
| 3-methyl-2-pentene trans | 9.72 |
| 3-methyl-2-pentene cis | 14.93 |
| 2,3-dimethyl-2-butene | 1.74 |

All of the olefins obtained from the decomposition of the tertiaryhexyl methyl ethers were tertiary olefins. This further demonstrates the selectivity of the ether process for recovery of tertiary olefins from refinery streams.

All of the above regenerations serve to demonstrate the efficiency of the regeneration step, and show quite conclusively that the process provides tertiary $C_4$ to $C_7$ hydrocarbons of extremely high purity. The alcohol of course, is also easily recoverable and can be recycled to the etherification step.

In commercial operation, for example, based on isobutylene extraction with methanol or isoamylene extraction with ethanol, alcohol, along with the $C_4$ or $C_5$ mixed stream from a petroleum refinery could be fed continuously to a fixed bed reactor containing the ion exchange catalyst. The resulting mixture of starting materials and ether is then sent to a distillation column to remove the unreacted $C_4$ or $C_5$ hydrocarbons. The bottoms from this column is vaporized and sent to a second fixed bed catalytic reactor containing a low area, solid, acid-acting metal oxide catalyst at the reaction temperature for decomposition to give substantially pure olefin, alcohol and some unreacted material with essentially no dialkyl ether formed. A final fractionator separates the olefin overhead for collection as a product while the mixture of alcohol and undecomposed ether is returned to the first or second reactor. Alternatively the bottoms from the first fractionator may be sent to a second fractionator where the ether-alcohol azeotrope is removed overhead. The bottoms from this column is substantially pure alcohol, which is recycled to the fixed bed etherification reactor. The overhead from the second fractionator is sent to the second reactor for decomposition.

This application is a continuation in part of copending application to Joseph A. Verdol, Serial No. 837,582, filed September 2, 1959, now abandoned.

It is claimed:

1. In a process for the separation of tertiary monoolefin of 4 to 7 carbon atoms in admixture with another monoolefin hydrocarbon in approximately the same boiling range, the steps which comprise reacting selectively tertiary monoolefin of the mixture with a primary alcohol of 1 to 6 carbon atoms to obtain the corresponding tertiary ether, separating the tertiary ether from unreacted hydrocarbons, decomposing the tertiary ether to said tertiary monoolefin and primary alcohol by contact with an acid-acting solid metal oxide catalyst selected from the group consisting of alumina, magnesia, and oxides of metals of Groups IVA, VA and VIA of the periodic table, at a temperature of about 350° F. to 1000° F. and recovering tertiary monoolefin product, said catalyst having a surface area of less than 25 square meters per gram.

2. The process of claim 1 in which the ether is decomposed by contact with an alumina-based catalyst at a temperature of about 600 to 900° F.

3. The process of claim 1 in which the ether is decomposed while contained in an azeotropic mixture with the said primary alcohol.

4. In a process for the separation of tertiary monoolefin of 4 to 6 carbon atoms in admixture with another monoolefin in approximately the same boiling range, the steps which comprise contacting the mixture in the liquid phase with a primary alcohol of 1 to 2 carbon atoms over a sulfonic acid exchange resin catalyst at a temperature of about 100 to 350° F. to obtain selectively the corresponding tertiary ether, separating the tertiary ether from unreacted hydrocarbons, decomposing the tertiary ether to said tertiary monoolefin and primary alcohol by contact with acid-acting solid alumina-based catalyst, at a temperature of about 450 to 900° F. and recovering a tertiary monoolefin product, said alumina-based catalyst having a surface area of less than about 25 square meters per gram.

5. The process of claim 4 in which the ether is decomposed while contained in an azeotropic mixture with the said primary alcohol.

6. The process of claim 20 in which the alumina-based catalyst is alpha alumina.

7. The process of claim 20 in which the alumina-based catalyst is fused silica-alumina containing a minor amount of silica.

8. The process of claim 20 in which the decomposition temperature is about 600 to 900° F.

9. The process of claim 2 in which the catalyst is alpha-alumina.

10. In a process for the production of tertiary mono-olefin of 4 to 7 carbon atoms and primary alcohol, the step which comprises contacting ether of the formula R—O—R' in which R is an aliphatic hydrocarbon radical of 4 to 7 carbon atoms having a tertiary carbon atom in the alpha position and R' is an aliphatic hydrocarbon radical of 1 to 6 carbon atoms with an acid-acting solid metal oxide catalyst selected from the group consisting of alumina, magnesia and oxides of metals of Groups IVA, VA and VIA of the periodic table, at a temperature of about 350° to 1000° F., said catalyst having a surface area of less than about 25 square meters per gram.

11. The process of claim 10 wherein the ether is contacted at a temperature of about 450 to 900° F.

12. The process of claim 10 in which R' is an aliphatic hydrocarbon radical of 1 to 2 carbon atoms.

13. The process of claim 12 where the ether is contacted in the vapor phase with alumina-based catalyst at a temperature of about 600 to 900° F.

14. The process of claim 13 where the alumina-based catalyst is a fused silica-alumina containing a minor amount of silica, said catalyst having a surface area of less than about 1 square meter per gram.

15. The process of claim 13 where the alumina-based catalyst is alpha-alumina, said catalyst having a surface area of less than about 1 square meter per gram.

16. The process of claim 1 wherein the surface area of the catalyst is up to 10 square meters per gram.

17. The process of claim 4 wherein the catalyst has a surface area of up to 10 square meters per gram.

18. The process of claim 10 wherein the catalyst has a surface area of up to 10 square meters per gram.

19. The process of claim 1 wherein the catalyst has a surface area of less than about 1 square meter per gram.

20. The process of claim 4 wherein the catalyst has a surface area of less than about 1 square meter per gram.

21. The process of claim 10 wherein the catalyst has a surface area of less than about 1 square meter per gram.

References Cited in the file of this patent

UNITED STATES PATENTS

| | | |
|---|---|---|
| 2,480,940 | Teum et al. | Sept. 6, 1949 |
| 2,540,587 | Litton et al. | Feb. 6, 1951 |
| 2,544,392 | Moore et al. | Mar. 6, 1951 |
| 2,922,822 | Beach | Jan. 26, 1960 |
| 2,972,645 | Verdol et al. | Feb. 21, 1961 |
| 3,026,362 | McKeever et al. | Mar. 20, 1962 |

UNITED STATES PATENT OFFICE
CERTIFICATE OF CORRECTION

Patent No. 3,170,000                 February 16, 1965

Joseph A. Verdol

It is hereby certified that error appears in the above numbered patent requiring correction and that the said Letters Patent should read as corrected below.

Column 6, line 44, strike out "the"; column 8, line 67, for "16° F." read -- 160° F. --; column 9, line 69, for "North" read -- Norton --; line 73, for "858%" read -- 85.8% --; column 12, line 48, after "than" insert -- about --.

Signed and sealed this 25th day of January 1966.

SEAL)

Attest:

ERNEST W. SWIDER                      EDWARD J. BRENNER

Attesting Officer                        Commissioner of Patents